United States Patent
Latharani Nataraja et al.

(10) Patent No.: US 12,547,614 B2
(45) Date of Patent: Feb. 10, 2026

(54) COMPUTER SYSTEMS AND METHODS FOR A GUIDED QUERY

(71) Applicant: Siemens Aktiengesellschaft, Munich (DE)

(72) Inventors: Gowri Latharani Nataraja, Munich (DE); Dmitry Ledentsov, Munich (DE)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 23 days.

(21) Appl. No.: 18/252,997

(22) PCT Filed: Oct. 27, 2021

(86) PCT No.: PCT/EP2021/079857
§ 371 (c)(1),
(2) Date: May 15, 2023

(87) PCT Pub. No.: WO2022/106169
PCT Pub. Date: May 27, 2022

(65) Prior Publication Data
US 2024/0012808 A1    Jan. 11, 2024

(30) Foreign Application Priority Data
Nov. 18, 2020   (EP) .................... 20208367

(51) Int. Cl.
*G06F 16/24* (2019.01)
*G06F 16/242* (2019.01)
*G06F 16/901* (2019.01)

(52) U.S. Cl.
CPC ...... *G06F 16/2425* (2019.01); *G06F 16/9024* (2019.01)

(58) Field of Classification Search
CPC .................................................. G06F 16/2425
USPC ....................................................... 707/736
See application file for complete search history.

(56) References Cited

U.S. PATENT DOCUMENTS

| | | | |
|---|---|---|---|
| 10,484,313 B1 * | 11/2019 | Sutherland | G06N 5/022 |
| 2012/0173243 A1 * | 7/2012 | Anand | H04M 3/4936 704/270.1 |
| 2018/0349377 A1 * | 12/2018 | Verma | G06N 3/045 |

OTHER PUBLICATIONS

Search Report for International Application No. PCT/EP2021/079857, 13 pages, Feb. 18, 2022.
Search Report for EP Application No. 20208367.1, 8 pages, May 3, 2021.

* cited by examiner

*Primary Examiner* — Syling Yen
(74) *Attorney, Agent, or Firm* — Slayden Grubert Beard PLLC

(57) ABSTRACT

Computer system (GUID) and computer-implemented method for a guidance session comprising measures like receive a user's request (req), select a guidance root node (r1, r2, rn) based on the user's request (req) by accessing a graph data base, wherein the graph data base provides guidance options (o1, . . . on) with links (l), group (grp) in an iterative manner guidance options (o) by type (ot) and put them into a queue (qu), dequeue (dequ) each option group (og2/og3) and check each option's relevance (rel) in the context, provide (show) the option (o) to the user (u) and provide a first guiding question, store user specific interactions history in the context memory and/or perform option-specific actions.

9 Claims, 3 Drawing Sheets

COMPUTER SYSTEMS AND METHODS FOR A GUIDED QUERY

CROSS-REFERENCE TO RELATED APPLICATIONS

This application is a U.S. National Stage Application of International Application No. PCT/EP2021/079857 filed Oct. 27, 2021, which designates the United States of America, and claims priority to EP Application No. 20208367.1 filed Nov. 18, 2020, the contents of which are hereby incorporated by reference in their entirety.

TECHNICAL FIELD

The present disclosure relates to computer systems and/or computer-implemented methods for a query.

BACKGROUND

Up to now, professionals and experts in digitalization like architects or developers, rely on their experience, their immediate social network, or utilize social networks such as Yammer or StackOverflow, or use other web resources such as internal websites or search engines to come up with answers. In many cases, the websites are either specialized (e.g. StackOverflow) or are generic such as search engines or social networks. In the case of the search engines, the information topic relevant to an expert is not organized sufficiently or the relevant information may be missing. In most cases, search engines do not provide functions to specify context. Getting too many generic or irrelevant results is also a problem with search engines.

The topic-specific websites on the other hand, such as intranet pages, may have only a subset of the information required to solve a particular problem. An architect, for example, must currently manually go through many search results to build up an understanding of the solution and must reconstruct the implicit knowledge available across multiple information sources for the same problem each time anew. In the case of topic specific information sources, the architect must refer to sources manually to extract relevant information for their requirements.

Known recommendation systems, chatbots based or machine learning do not provide enough data in specific use cases, as the domain may be very specialized, without statistically irrelevant data availability. Each request may have its own unique context. Catalogues with filtering abilities provide too many options to choose from at once.

SUMMARY

Accordingly, the teachings of the present disclosure may be used to improve queries on topic specific use cases, in particular for digitalization and software development. For example, some embodiments include a method for a guidance session comprising: Receive a user's request (req); Start (st) by selecting (sel) a guidance root node (r1, r2, rn) based on the user's request (req) by accessing a graph data base, wherein the graph data base provides guidance options (o1-*n*) with links (l), leading to: Retrieve (ret) options (o1, . . . o4) connected to the selected root node (r1, r2, rn), Group (grp) in an iterative manner retrieved options (o1, . . . on) to option groups (og2/og3) by type (ot) followed by Queue (qu) the option groups (og2/og3) followed by Dequeue (dq) an option group (og2/og3) while the queue is not empty (dec-n), followed by Relevance decision (rel) in the user specific context of the guidance session, in an iterative manner for each option (o) of a dequeued option group (og2/og3), go to next option (next o) iteration in case of no relevance, Present (show) option (o) to the user (USE) in case of relevance and provide a first guiding question, Store (store) user specific interactions history in the context memory comprising store option (o1) in the context memory if chosen by the user (USE) and/or Perform (perf) option-specific action, Retrieve (ret2) options (o) connected to the chosen option and with the retrieved options Go to next iteration of group (grp) and queue (qu) step, wherein additional new data source information (res 1, . . . resn) can be added as nodes to the graph data base.

In some embodiments, the method further comprises the measure of providing links (l) to knowledge sources (KNOW), providing an answer to the user (USE) or start an application.

In some embodiments, the Guidance Options are grouped (og2/og3) by type (ot2, ot3, ot4).

As another example, some embodiments include a computer system (GUID) for a guided query comprising the components: Frontend software component for providing guiding questions to a user (USE); Storage component (STOR) comprising a graph data base containing guidance options (o1-*n*) with links (l); Guidance software component comprising a guidance algorithm providing an option selection and retrieval of data associated with a selected option (o, ot), wherein the guidance algorithm enables to query the graph data base and wherein the guidance algorithm enables creating, updating and querying a user specific context memory on a further storage component.

In some embodiments, the Guidance software component is stored and executed on a computer.

As another example, some embodiments include a Computer system (GUID), wherein the graph data structure comprises a guidance graph, where guidance root nodes (r1, . . . , rn) represent options at which a guidance session begins.

In some embodiments, the guidance graph comprises at least one guidance root node (st), where the guidance starts.

In some embodiments, the option nodes can trigger different option-specific actions.

In some embodiments, the directional connections between the guidance nodes (r1, r2, rn) represent the relations which are used to resolve recommendations for a subset of chosen nodes.

BRIEF DESCRIPTION OF THE DRAWINGS

The properties, features and advantages of the teachings herein are described above and the manner in which they are achieved will become clearer and more distinctly comprehensible in conjunction with the description of the exemplary embodiments that follows, these being explained in more detail in conjunction with the FIGS. 1 to 3, in a schematic depiction.

DETAILED DESCRIPTION

Figure 1:
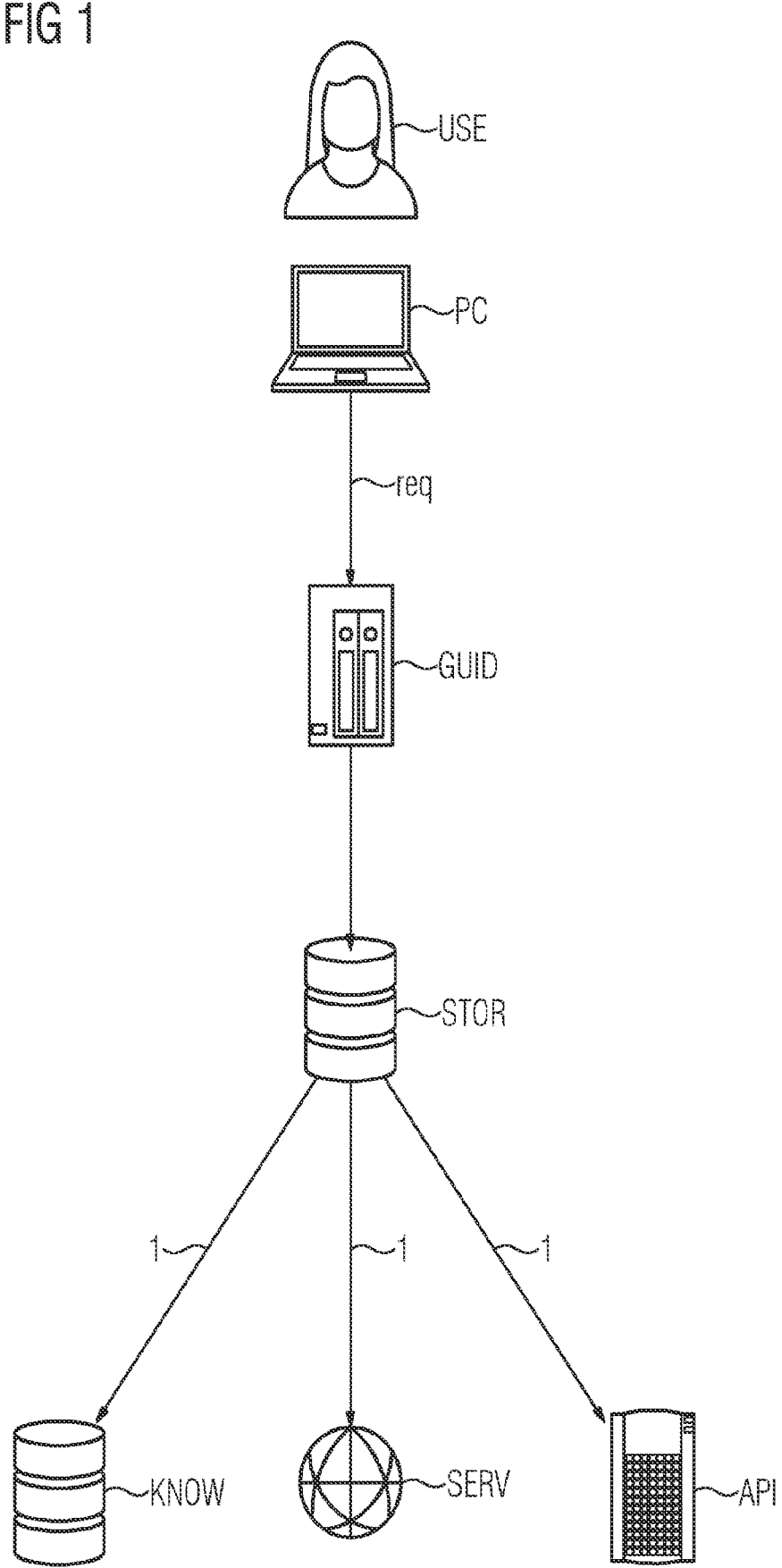
FIG. 1 shows a diagram of an exemplary embodiment of a guidance computer system incorporating teachings of the present disclosure.

The present disclosure describes computer-implemented methods, computer systems, guidance algorithms and computer program products for a guided query comprise a graph database in combination with a context memory. In some embodiments, the computer system for a guided query comprises: frontend software component for providing guiding questions to a user, storage component comprising a graph data base containing guidance options with links, guidance software component comprising a guidance algorithm providing an option selection and retrieval of data associated with a selected option, wherein the guidance algorithm enables to query the graph data base and wherein the guidance algorithm enables creating, updating and querying a user specific context memory on a further storage component. The further storage component for the context memory is integrated in or accessible by the guidance system. In some embodiments, the guidance software component is stored and executed on a computer, wherein the computer can be a local computing system or web service.

In some embodiments, the graph data structure comprises a guidance graph, where guidance root nodes represent options at which a guidance session begins, wherein guidance session corresponds to the provided method.

In some embodiments, the guidance graph comprises at least one guidance root node, where the guidance starts. In particular, the computer system comprises option nodes that can trigger different option-specific actions.

In some embodiments, the computer system comprises directional connections between the guidance nodes representing the relations, which are used to resolve recommendations for a subset of chosen nodes. The proposed guidance system provides a unique way of utilizing graphs to provide guidance for professionals. It not only overcomes the deficiencies of present knowledge graphs and decision trees, it rather takes these as a basis for research and explore semantic connections and adds a superstructure to it, that provides a stateful system that navigates the graph.

While a common knowledge graph traversal, e.g. browsing Wikipedia, would quickly increase the number of articles to read, taking into account the context of a query, the provided system narrows down the scope. The guidance system provides traversal through multiple paths, with considering the context of the query type.

In some embodiments, a computer-implemented method for a guidance session comprises the measures: receive a user's request, select a guidance root node based on the user's request by accessing a graph data base, wherein the graph data base provides guidance options with links, group in an iterative manner guidance options by type and put them into a queue, dequeue each option group and check each option's relevance in the context, provide the option to the user and provide a first guiding question, store user specific interactions history in the context memory and/or perform option-specific actions.

Such guidance session is representing a guided query respectively, at which end option-specific actions are performed, that can be information output or providing a link. In particular, the computer-implemented method further comprises the measure of providing links to knowledge sources, providing an answer to the user or start an application. Preferably, the measures are performed or kicked off by the guidance algorithm.

The graph can have multiple entry points. In an exemplary embodiment of the method the guidance starts at any existing guidance root node, see description of FIG. 2 in which a data model illustration is given. The multiple entry points allow flexibility of use of the guidance system.

In some embodiments, a guidance algorithm performing the measures of a computer-implemented method includes: start by selecting a guidance root node, leading to retrieve options connected to the selected root node, then group in an iterative manner retrieved options to option groups which is followed by the step queue the option groups followed by dequeue an option group while the queue is not empty, followed by relevance decision in the user specific context of the guidance session, in an iterative manner for each option of a dequeued option group, go to next option iteration in case of no relevance, then present option to the user in case of relevance, store option in the context memory if chosen by the user and perform option-specific action, then retrieve options connected to the chosen option and with the retrieved options and go to next iteration of the group and queue step.

In some embodiments, the guidance options are grouped by type. The guidance algorithm does not traverse a unique path through the graph, but rather multiple paths at the same time. The proposed solution does not depend on machine learning techniques since there is not enough relevant internal knowledge-based data to train machine learning algorithms. Instead, the proposed guidance system stores the knowledge explicitly in the form of graph. The user specific information is generated in the form of context at each step of guidance session and is used to further traverse the graph. Concurrently, the Guidance System or the guidance session does not overwhelm the user with too many options but queues them in order to interrogate the user in a sequential fashion.

In some embodiments, a computer program product comprises instructions which, when the program is executed by a computer, cause the computer to carry out the steps of the method disclosed by the present disclosure.

In some embodiments, there is a provision apparatus for the aforementioned computer program product is claimed wherein the provision apparatus stores and/or provides the computer program product, e.g. saves and/or provides a program data and/or instruction block of said instructions. The providing apparatus can be a data storage saving and/or providing the computer program product. In some embodiments, the providing apparatus can be a computer system and/or a server system and/or a network and/or a cloud-based computer system and/or virtual computer system. The providing apparatus saves and/or provides the computer program product.

In some embodiments, the complete computer program product is provided by said providing apparatus in the form of a download, for example, as a file or a data stream. In some embodiments, the computer program product is provided by at least two partial downloads, for example, provided by a peer to peer network, each containing a piece of said computer program product. For example such a computer program product can be provided by a data storage, which is read and executed by a computer system. As a consequence the computer system is able to execute the disclosed method. In some embodiments, the computer program configures a manufacturing device as above mentioned.

A data storage or computer-readable medium can be electronic, magnetic, optical, or a semiconductor system (or apparatus or device). Examples of a computer-readable medium include, but are not limited to, a semiconductor or solid state memory, magnetic tape, a removable computer diskette, a random access memory (RAM), a read-only memory (ROM), a rigid magnetic disk, an optical disk, etc. Current examples of optical disks include compact disk-read only memory (CD-ROM), compact disk-read/write (CD-R/W) and digital versatile disk (DVD).

In some embodiments, the provision apparatus is a network service, a computer system, a server system, particularly a distributed computer system, a cloud-based computer system and/or a virtual computer system that stores and/or provides the computer program product in the form of a data stream, for example. This provision is effected as a download in the form of a program data block and/or instruction data block, as a file, particularly as a download file, or a data stream, particularly as a download data stream, of the complete computer program product, for example. This provision can alternatively be effected as a partial download that consists of multiple parts and is downloaded particularly via a peer-to-peer network or provided as a data stream, for example. Such a computer program product is read in, for example using the provision apparatus in the form of the data storage medium, in a system and executes the program instructions, so that the method according to the invention is executed on a computer, or configures the creation device such that it creates cited system and/or execution unit according to the invention.

In some embodiments, the presented embodiments are implemented by a processor and/or a memory device unless otherwise noted. In detail, to implement and/or execute the teachings herein, the method, components, devices etc. comprise at least one processor and/or at least one memory device unless otherwise noted. In some embodiments, the method, components, devices etc. comprise, for example, other features known by a skilled person. For example, these features can be an input device, like a computer mouse, or a display device, like a TFT-display.

In some embodiments, a processor is specifically configured to execute the computer readable instructions such that said processor is configured to perform functions which implement a step/all steps of the method.

Definitions

As used herein, the term "graph data structure" is a database that uses graph structures for semantic queries with nodes, edges, and properties to represent and store data. database (GDB)

Unless specifically stated otherwise, as apparent from the following discussions, it is appreciated that throughout the specification discussions utilizing terms such as "processing", "computing", "computer-based", "calculating", "determining", "generating", "configuring" or the like, refer to the action and/or processes of a computer that manipulates and/or transforms data into other data, said data represented as physical, e.g. such as electronic, quantities.

The term "computer" should be expansively construed to cover any kind of electronic device with data processing capabilities, including, by way of non-limiting example, personal computers, servers, handheld computer systems, Pocket PC devices, Cellular communication device and other communication devices with computing capabilities, processors and other electronic computing devices.

As used herein, the term "processor" refers, for example, to controllers, microcontrollers (e.g. digital signal processor (DSP) possibly in combination with memory and storage units memory unit storing computer-readable instructions, application specific integrated circuit "ASIC", etc.), processor cores, central processing units, integrated circuits/processing circuitry (e.g. application specific integrated circuit "ASIC", field programmable gate arrays "FPGA" etc.) or digital signal processors. Furthermore, the term "processor" can, for example, refer to virtual processors, virtual CPUs, soft processors or soft CPUs. Moreover, said processor can, for example, be configured to execute computer readable instructions such that said processor is preferably configured to perform functions which implement the invention.

As used herein, the term "component" refers, for example, to a processor and/or a memory unit storing computer-readable instructions. For example, the processor is specifically configured to execute the computer readable instructions such that said processor is preferably configured to perform functions which implement the invention, such as a step of the inventive method. Furthermore, the term "component" can, for example, refer to means (e.g., a processor) which are configured to implement/execute functions/steps of the invention.

As used herein, the term "subtree", "tree" or the like, refer, for example, to data structures storing information about the technical system and/or components of the technical system. In some embodiments, a subtree is a branch of a (component fault) tree or a partial (component fault) tree, defined, for example, by a selected node in the tree as top-level node of the subtree.

In the following, possible embodiments of the different aspects of the present disclosure are described in more detail with reference to the enclosed figures. The accompanying drawings are intended to provide a better understanding of the embodiments. They show embodiments and serve in conjunction with the description to explain principles and concepts of the disclosed subject matter. Other embodiments and many of the cited advantages will emerge in respect of the drawings. The elements of the drawings are not necessarily shown in scale with one another. Identical reference characters here designate identical components or components of comparable effect.

As shown by the diagram in FIG. 1, an exemplary embodiment of the guidance system provides the following features:

The proposed Guidance System GUID incrementally guides a user USE by providing relevant guiding questions and suggestions. The actual knowledge may reside in other systems, for example databases EXT, internal repositories, social networking websites SERV etc. but the Guidance System GUID contains explicit links l towards the knowledge KNOW, like solutions, templates, articles and/or actions to take. The knowledge in the Guidance System GUID is stored in the form of a graph, compare FIG. 2, where the nodes provide context or content for the guidance.

Figure 2:
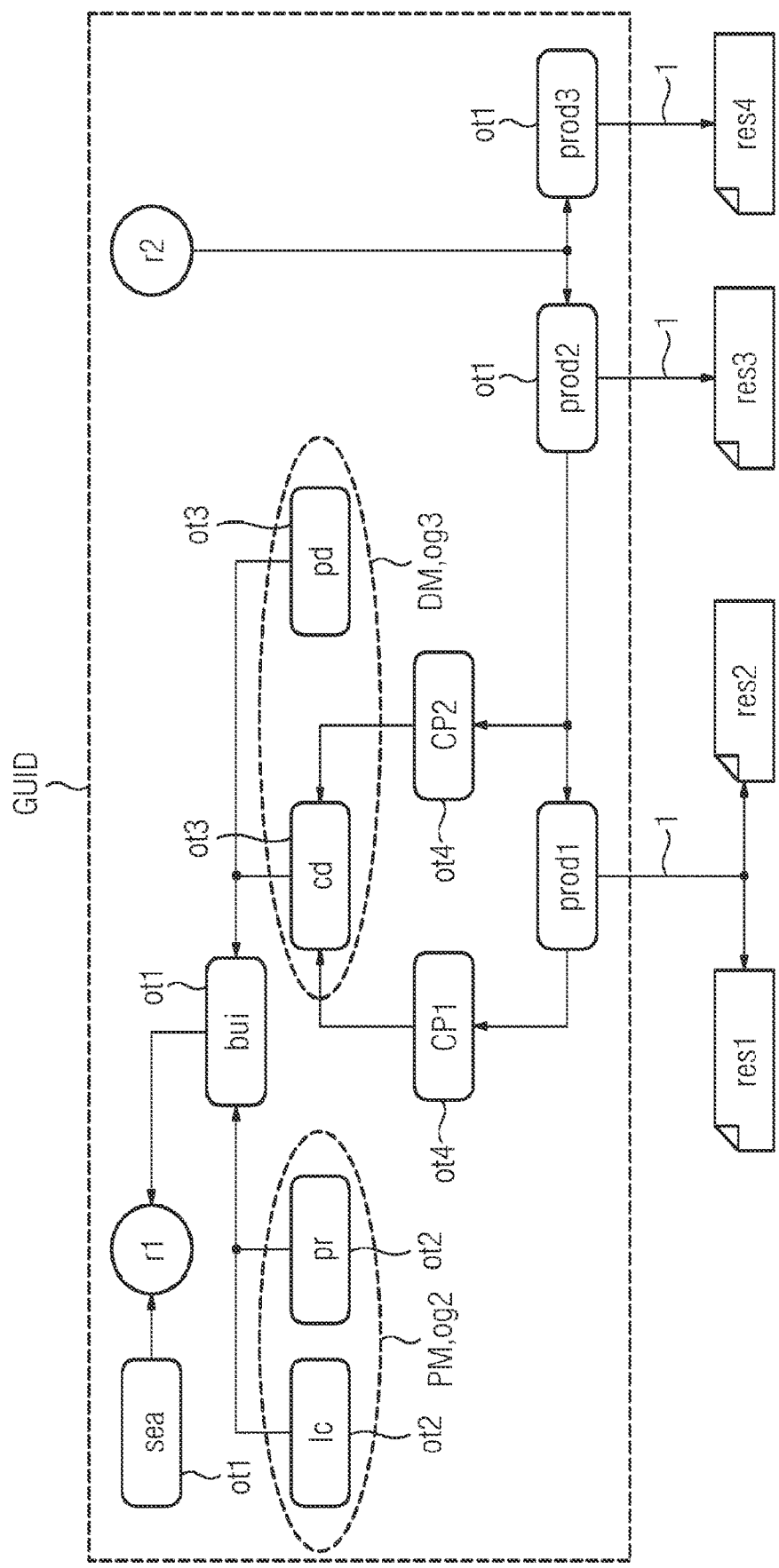
FIG. 2 shows a flowchart representing an embodiment of the guidance system data model incorporating teachings of the present disclosure.

FIG. 2 shows a flowchart representing an exemplary workflow of an embodiment of the guidance system GUID. Nodes are for example root nodes, r1, r2, rn, where the query starts. The context available in the nodes is used to traverse the graph to guide the user USE to context relevant information, res1-resn.

During a guidance session, the graph is incrementally traversed, starting from a dedicated starting node r1, r2 or rn, a so-called guidance root. Nodes can be added to the guidance context via any form of interactive feedback with the user USE. The guidance system GUID is extendable via the underlying data. Each additional new data source information res 1, ... resn can be added to the Guidance System graph GUID as nodes. In case the categories of the additional data do not require a modification of the user interface, the guidance software doesn't even need to be updated.

If several available options o1, ... on exceed a reasonable number, then moderation, filtering based on additional algorithms, pagination, postponing the options o1, ... on for later, can be applied to keep the user experience lean.

A dedicated user interface is for publishing the knowledge artifacts and their relations. Basically, a guidance session follows a procedure, presented in FIGS. 2 and 3: given a guidance root r1, r2, select all the options ot1-ot4 pointing towards that root r1, r2 and group og2/og3 the options via their tag ot1, . . . ot4. This tag could be a deployment option cd/pd or an action sea/bui. Then queue qu the option groups og2/og3, compare FIG. 3. While queue not empty dec-n, the next step is to dequeue deq the option group. Only the options o1, . . . on are presented to the user USE, which are relevant given the context of the guidance interaction, e.g. which are connected, that means directed towards the selected ones to the already selected options or to all options, if none option is selected yet.

The selected option than is added to the selected options list. The option nodes and connections can have properties associated with them that can be used to trigger actions, such as searching for APIs, presenting a special widget or showing links l to resources res1-resn. This association with custom actions is very powerful and enables various scenarios.

An architect for example might use a Guidance System GUID as exemplary presented in FIG. 2, accessing the system via a webpage r1, to query for information for his use case. This begins a guidance session with the architect. The architect can now select among the multiple options o1, . . . on like "Build an App" bui or "Search for keywords" sea. Based on option selected at each guidance session interaction, the next possible options are suggested. The example above is one such data model used in a guidance system.

The interaction between the architect USE and the Guidance System GUID can look like the following exemplary chat in Tabs 1 and 2. The last two chat bubbles of Tab. 1 provide the two available options for the user USE of the system GUID.

Tab. 1 shows a first chat box with an exemplary chat:

| Chatbot: | User: |
| --- | --- |
| Hello, Welcome to the Guidance System Please enter your query, and we'll see how we can help. | |
| | building sensors |
| You've requested 'building sensors'. What would you like to do? | |
| | build an app for your concern |
| | just search for the keywords |

The next sample guidance session in Tab. 2 shows a complete interaction, which results in suggestions to browse to documentation resources res1, . . . resn. One of the links l, e.g. to Mendix app on Mindsphere is shown only because earlier in the discussion, the question about the deployment in the Cloud was answered with Mindsphere, and not Azure, for example. This is what demonstrates the aforementioned context of the guidance session, having an influence on the proposed information sources res1, . . . resn.

Tab. 2 shows a second chat box with an exemplary chat:

| Chatbot: | User: |
| --- | --- |
| Hello, Welcome to the Guidance System Please enter your query, and we'll see how we can help. | |
| | building sensors |
| You've requested 'building Sensors'. What would you like to do? | |
| | build an app for your concern |
| You've requested 'build an app for your concern'. What would you like to do? | |
| | no programmers available |
| You've requested 'no programmers available'. What would you like to do? | |
| | deploy in the Cloud |
| You've requested 'deploy in the Cloud' What would you like to do? | |
| | Mindsphere Cloud |
| You've requested 'Mindsphere Cloud'. What would you like to do? | |
| | build and deploy a Mendix app |
| Visit the Mendix Homepage for more Information Learn how to deploy a Mendix app on Mindsphere You've requested 'build and deploy a Mendix app'. What would you like to do? | |
| | use the Data Layer as the data source |

Figure 3:
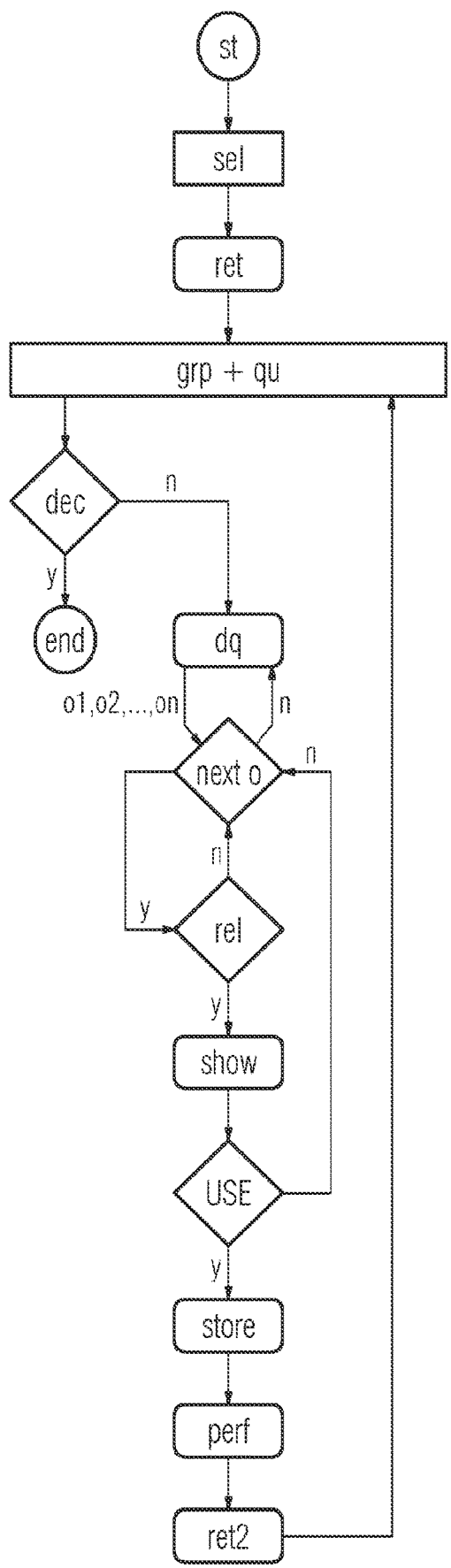
FIG. 3 shows a flowchart representing an embodiment of the guidance algorithm incorporating teachings of the present disclosure.

FIG. 3 shows a flowchart representing an exemplary workflow of an embodiment of the algorithm incorporating teachings of the present disclosure.

An exemplary algorithm in pseudocode could read:

```
Start Guidance Session
Choose a Guidance Root node
Query Options connected to the root node
Group selected Options by type and put them into the queue
WHILE Queue NOT Empty
    DO Dequeue an Option Group (an algorithm may be used to
    choose a group to dequeue)
    FOR each Option in the Option Group
        IF Option relevant in the Context (an algorithm may
        be used to determine relevancy)
            THEN Present the Option to the user
        ENDIF
    ENDFOR
    User chooses an Option out of the presented ones
    Store the chosen Option in the Context Store
    Perform Option-specific actions
    Query Options connected to the Chosen Option
    Group selected Options by type and put them into the
    queue
ENDWHILE
```

This describes an algorithm based on a guidance graph, where nodes represent options o1, . . . on to be guided through or towards. The directional connections between the guidance nodes represent the relations, such is IS_OPTION, which are used to resolve recommendations for a subset of chosen nodes. The guidance starts from a special node, which is a guidance root r1, r2, . . . rn. There can be multiple guidance roots r1, r2, . . . rn in the graph, for different use cases.

In summary, a guidance system GUID is proposed that can be used by professionals, for example architects, developers, managers, etc. to query for their digitalization use cases. The system can guide the user USE by directing them to relevant information res1, . . . resn based on user specific context as well as query specific context. This query specific context refers to the previous interactions in the guidance session which further improves providing relevant information. The guidance system GUID has access to a graph, e.g. a graph database and a context memory. The graph database especially stores information about other knowledge sources KNOW. In the context memory, the context related information to a specific user querying the guidance system is stored.

REFERENCES

USE user
PC personal computer
req request
GUID guidance system, e.g. including storage of graph database and including context memory
STOR storage component for storage of graph database and context memory, can be included in the guidance system
l link
KNOW storage for knowledge source, e.g. Wiki, Code, Catalogue
SERV server, connection to communication network or search service
API external API
r1, r2, . . . rn guidance root 1, 2, n: examples—web pages, starter project/wizard
ot1, ot2, . . . otn option type
o1, o2, . . . on option
og2/og3 . . . ogn option group
sea search for keywords
bui build an app
lc low code
pr programmers available
PM Programming model
cd cloud deployment
pd on premise deployment
DM Deployment model
CP1, CP2, . . . CPn cloud platform 1, 2, . . . n:
   Examples: Siemens Mindsphere, Microsoft azure; Cloud product Mendix is deployed on siemens mindsphere or cloud product data layer is deployed on Microsoft azure.
prod 1, 2, n cloud product 1, 2,
   examples: Mendix, data layer, datafinity
res1, res2, . . . n external resource 1, 2, 3, 4,
   examples: mendix homepage, Mendix on Mindsphere, Data Layer Starter Project, Datafinity Homepage
st start
sel select/select a guidance root node
ret, ret2 Retrieve
grp, qu group guidance options by type and put them into the queue
dec decide
y yes
n no
dq dequeue/dequeue an option group
next o go to next option iteration
rel relevance check, whether option is relevant in the context
show show to the user
store storing in the context memory
perf perform/perform option-specific actions
end end

What is claimed is:

1. A method for a guidance session, the method comprising:
   receiving a user's request;
   selecting a guidance root node based on the user's request by accessing a graph data base storing guidance options with links;
   wherein the graph database comprises multiple graph structures having respective nodes, edges, and properties representing relationships between the nodes;
   retrieving options connected to the selected root node;
   grouping retrieved options to a plurality of option groups by type in an iterative manner;
   queuing the plurality of option groups;
   dequeuing an option group from the plurality of option groups while the queue is not empty;
   making a relevance decision in the user specific context of the guidance session for a first option of a dequeued option group as one of: not relevant or relevant;
   if the first option is relevant, presenting the first option to the user and providing a first guiding question;
   if the first option is not relevant, repeating the relevance decision for a next option;
   storing user specific interactions history in the context memory comprising store option in the context memory based on a user response to the first guiding question; and/or
   performing an option-specific action in response to the user response;
   retrieving options connected to a chosen option;
   going to next iteration of group and queue step;
   wherein additional new data source information can be added as nodes to the graph data base.

2. A method according to claim 1, further comprising providing links to knowledge sources providing an answer to the user or start an application.

3. A method according to claim 1, wherein Guidance Options are grouped by type.

4. A computer system for a guided query, the system comprising:
   a frontend interface to pose guiding questions to a user;
   a memory storing a graph data base storing guidance options with links; and
   a processor to execute a guidance algorithm providing an option selection and retrieval of data associated with a selected option;
   wherein the graph database comprises multiple graph structures having respective nodes, edges, and properties representing relationships between the nodes;
   wherein the guidance algorithm queries the graph data base to select a guidance root node based on the user's request, retrieves options connected to the selected root node, groups retrieved options to a plurality of option groups by type, queues the plurality of option groups, and dequeues an option group from the plurality of option groups while the queue is not empt, makes a relevance decision in the user specific context of the guidance session—for a first option of a dequeued option group as one of: not relevant or relevant, if the first option is relevant, presenting the first option to the user and providing a first guiding question; if the first option is not relevant, repeating the relevance decision for a next option; and
   wherein the guidance algorithm enables creating, updating, and querying a user specific context memory on a further storage component.

5. A computer system according to claim 4, wherein the Guidance software component is stored and executed on a computer.

6. A computer system according to claim 4, wherein the graph data structure comprises a guidance graph, wherein guidance root nodes represent options at which a guidance session begins.

7. A computer system according to claim 6, wherein the guidance graph comprises at least one guidance root node where the guidance starts.

8. A computer system according to claim 4, wherein option nodes can trigger different option-specific actions.

9. A computer system according to claim 4, wherein directional connections between the guidance nodes represent the relations used to resolve recommendations for a subset of chosen nodes.

* * * * *